(12) United States Patent
Ando et al.

(10) Patent No.: US 10,404,151 B2
(45) Date of Patent: Sep. 3, 2019

(54) PLANETARY GEAR SPEED REDUCTION DEVICE AND DRIVING MECHANISM

(71) Applicant: NIDEC SANKYO CORPORATION, Suwa-gun, Nagano (JP)

(72) Inventors: Masaaki Ando, Nagano (JP); Tadashi Takeda, Nagano (JP); Shinichi Yoshikawa, Nagano (JP); Toshifumi Tsuruta, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 524 days.

(21) Appl. No.: 15/213,863

(22) Filed: Jul. 19, 2016

(65) Prior Publication Data

US 2017/0040880 A1    Feb. 9, 2017

Related U.S. Application Data

(60) Provisional application No. 62/202,418, filed on Aug. 7, 2015.

(30) Foreign Application Priority Data

Oct. 30, 2015  (JP) .................................. 2015-213891
Oct. 30, 2015  (JP) .................................. 2015-213892

(51) Int. Cl.
*H02K 49/10*   (2006.01)
*H02K 7/116*   (2006.01)
*H02K 7/118*   (2006.01)

(52) U.S. Cl.
CPC ........... *H02K 49/102* (2013.01); *H02K 7/116* (2013.01); *H02K 7/1185* (2013.01)

(58) Field of Classification Search
CPC ..... H02K 7/116; H02K 7/1185; H02K 49/102
USPC ....................... 310/90.5, 91, 92, 99
See application file for complete search history.

(56) References Cited

U.S. PATENT DOCUMENTS

| | | | | |
|---|---|---|---|---|
| 3,915,031 A | * | 10/1975 | Hanson | F16H 47/085 475/249 |
| 4,091,689 A | * | 5/1978 | Huffman | B60K 17/046 180/255 |
| 4,362,070 A | * | 12/1982 | Murayama | F16H 37/086 475/217 |
| 4,824,419 A | * | 4/1989 | Kumm | F16H 9/10 474/49 |
| 5,013,949 A | * | 5/1991 | Mabe, Jr. | H02K 9/102 310/103 |
| 5,242,336 A | * | 9/1993 | Hori | F16H 1/46 475/220 |
| 5,385,514 A | * | 1/1995 | Dawe | F16H 13/06 475/336 |

(Continued)

FOREIGN PATENT DOCUMENTS

JP    2012163186 A    8/2012

*Primary Examiner* — Julio C. Gonzalez
*Assistant Examiner* — Rashad H Johnson
(74) *Attorney, Agent, or Firm* — Cantor Colburn LLP

(57) ABSTRACT

A planetary gear speed reduction device may include a magnetic sun gear; a plurality of magnetic planetary gears which each revolve around the magnetic sun gear while rotating; and a magnetic internal gear arranged surrounding the multiple magnetic planetary gears from an outer circumferential side. An outside diameter of the magnetic sun gear and an outside diameter of the magnetic planetary gears may be equal.

10 Claims, 6 Drawing Sheets

(56) References Cited

U.S. PATENT DOCUMENTS

| | | | | |
|---|---|---|---|---|
| 5,462,498 A * | 10/1995 | Lindblad | B60N 2/0232 | 297/362 |
| 5,692,989 A * | 12/1997 | Kamlukin | F16H 1/28 | 475/338 |
| 5,730,232 A * | 3/1998 | Mixer | B25B 21/008 | 173/176 |
| 6,585,620 B1 * | 7/2003 | Bae | F16H 1/46 | 475/331 |
| 7,628,727 B2 * | 12/2009 | Nagai | F16H 3/005 | 475/291 |
| 7,980,324 B2 * | 7/2011 | Bixler | B25F 5/001 | 173/176 |
| 9,216,504 B2 * | 12/2015 | Zhang | B25F 5/001 | |
| 2002/0111243 A1 * | 8/2002 | Minegishi | F16H 1/32 | 475/178 |
| 2005/0264111 A1 * | 12/2005 | Tanaka | B62J 6/12 | 310/75 C |
| 2005/0264112 A1 * | 12/2005 | Tanaka | B60B 27/02 | 310/75 C |
| 2005/0272548 A1 * | 12/2005 | Nagai | F16H 3/54 | 475/91 |
| 2007/0191177 A1 * | 8/2007 | Nagai | F16H 3/005 | 475/291 |
| 2009/0058214 A1 * | 3/2009 | Mizushima | H02K 7/116 | 310/203 |
| 2009/0289514 A1 * | 11/2009 | Fukuoka | H02K 7/116 | 310/83 |
| 2010/0186978 A1 * | 7/2010 | Sekino | B23B 45/008 | 173/48 |
| 2010/0227725 A1 * | 9/2010 | Inayoshi | F16C 27/066 | 475/183 |
| 2010/0323836 A1 * | 12/2010 | Wang | F16H 1/46 | 475/1 |
| 2012/0025644 A1 * | 2/2012 | Ogawa | B60K 7/0007 | 310/83 |
| 2012/0046142 A1 * | 2/2012 | Miyawaki | G03G 15/757 | 475/331 |
| 2014/0031165 A1 * | 1/2014 | Kubota | F16H 1/28 | 475/331 |
| 2014/0141931 A1 * | 5/2014 | Ishizuka | B60K 17/046 | 475/348 |
| 2016/0156248 A1 * | 6/2016 | Lueker | H02K 7/116 | 310/83 |
| 2016/0156249 A1 * | 6/2016 | Chen | H02K 7/116 | 310/83 |
| 2016/0376911 A1 * | 12/2016 | Sheridan | F01D 25/16 | 415/124.1 |
| 2017/0040880 A1 * | 2/2017 | Ando | H02K 7/116 | |
| 2017/0198801 A1 * | 7/2017 | Onitake | F16D 11/14 | |
| 2018/0142747 A1 * | 5/2018 | Nanahara | F16D 65/18 | |

* cited by examiner

PLANETARY GEAR SPEED REDUCTION DEVICE AND DRIVING MECHANISM

CROSS REFERENCE TO RELATED APPLICATION

The present invention claims priority under 35 U.S.C. § 119 to Japanese Application No. 2015-213891 filed Oct. 30, 2015, and Japanese Application No. 2015-213892, filed Oct. 30, 2015, the entire contents of which are incorporated herein by reference, and priority is also claims to U.S. Provisional Application No. 62/202,418, filed Aug. 7, 2015, the disclosure of which is also incorporated by reference.

FIELD OF TECHNOLOGY

At least an embodiment of the present invention relates to a magnetic planetary gear speed reduction device. Also, at least an embodiment of the present invention relates to a driving mechanism equipped with the said planetary gear speed reduction device.

BACKGROUND

A magnetic planetary gear speed reduction device is conventionally known (Patent Reference 1, for example). A planetary gear speed reduction device disclosed in Patent Reference 1 is equipped with a sun gear which is a magnetic gear and four planetary gears which are also magnetic gears. The sun gear and the planetary gears are formed cylindrically; the four planetary gears are arranged to surround the sun gear from the outer circumferential side. On the outer circumference side of the four planetary gears, a cylindrical housing yoke is arranged. In this planetary gear speed reduction device, the outside diameter of the sun gear is smaller than the outside diameter of the planetary gears.

Further, in the planetary gear speed reduction device disclosed in Patent Reference 1, the sun gear is secured on the outer circumferential surface of an input shaft and also secured to the outer circumferential surface of rotary shafts. The rotary shafts to which the planetary gears are secured are rotatably held by a planetary carrier.

PATENT REFERENCE

[Patent Reference 1] Unexamined Japanese Patent Application 2012-163186 Publication In the planetary gear speed reduction device disclosed in Patent Reference 1, the outside diameter of the sun gear is smaller than the outside diameter of the planetary gears, and the distance between the planetary gears which are arranged adjacent to each other around the outer circumference of the sun gear is short. Therefore, in this planetary gear speed reduction device, magnetic interference may occur between the planetary gears which are arranged adjacent to each other, degrading the efficiency in transmitting the power force from the sun gear to the planetary gears.

Also, in the planetary gear speed reduction device disclosed in Patent Reference 1, friction loss in the planetary gear speed reduction device in the axial direction of the rotary shaft on which the planetary gears are fixed (that is, the axial direction of the input shaft to which the sun gears are fixed) is small.

Then, at least an embodiment of the present invention provides a magnetic planetary gear speed reduction device having a magnetic sun gear and magnetic planetary gears, and provides an planetary gear speed reduction device in which the efficiency of transmitting the power force between the magnetic sun gear and the magnetic planetary gears can be increased. Also, at least an embodiment of the present invention provides a driving mechanism equipped with the said planetary gear speed reduction device.

At least an embodiment of the present invention provides a magnetic planetary gear speed reduction device having a magnetic sun gear and magnetic planetary gears, and provides a planetary gear speed reduction device in which friction loss in the axial direction of a rotary shaft, to which the magnetic planetary gears are fixed, can be reduced. Also, at least an embodiment of the present invention provides a driving mechanism having the said planetary gear speed reduction device.

To achieve the above, the planetary gear speed reduction device of at least an embodiment of the present invention comprises a magnetic sun gear, multiple planetary gears which revolve around the magnetic sun gear while rotating on the axes thereof, and a magnetic internal gear arranged, surrounding the multiple magnetic planetary gears from the outer circumferential side; the outside diameter of the magnetic sun gear and the outside diameter of the magnetic planetary gears are equal to one another.

In the planetary gear speed reduction device of at least an embodiment of the present invention, the outside diameter of the magnetic sun gear and the outside diameter of the magnetic planetary gear are equal to each other. Therefore, in this embodiment, the magnetic planetary gears which are adjacent to each other on the outside circumferential side of the magnetic sun gear can be more distanced, thus making it possible to prevent magnetic interference between the adjacently-arranged magnetic planetary gears. Therefore, in this embodiment, the efficiency of transmitting the power force between the magnetic sun gear and the magnetic planetary gears can be increased.

In at least an embodiment of the present invention, the planetary gear speed reduction device is provided with a single magnetic sun gear and four magnetic planetary gears which are arranged at a pitch of 90 degrees around the magnetic sun gear. In this configuration, the magnetic sun gear and the magnetic planetary gears may be formed in the same shape and that the number of magnetic poles on the outer circumferential surface of the magnetic sun gear and the number of magnetic poles on the outer circumferential surface of [each] magnetic planetary gear are equal to each other. Also, the reduction rate of the planetary gear speed reduction device may be one-fourth. By configuring the planetary gear speed reduction device in this way, the magnetic sun gear and the magnetic planetary gears can be in a common use, making it possible to reduce the number of different kinds of components that configure the planetary gear speed reduction device.

The planetary gear speed reduction device of at least an embodiment of the present invention can be used in a driving mechanism equipped with a motor, which is connected on the input side of the planetary gear speed reduction device and connected also to the magnetic sun gear by an output shaft thereof, and a driving mechanism equipped with a reduction gear which is connected to the output side of the planetary gear speed reduction device. In this driving mechanism, the output shaft of the motor is connected to the magnetic sun gear of the planetary gear speed reduction device; since the magnetic planetary gear speed reduction device is arranged at a position at which the rotation speed is relatively fast, the noise of the driving mechanism can be reduced.

To achieve the above, the planetary gear speed reduction device of at least an embodiment of the present invention comprises a magnetic sun gear, multiple magnetic planetary gears which revolve around the magnetic sun gear while rotating on the axes thereof, a magnetic internal gear arranged surrounding the multiple magnetic planetary gears from the outer circumferential side, multiple rotary shafts, to which the multiple magnetic planetary gears are respectively secured, a planetary carrier for rotatably holding the multiple rotary shafts, and a main body portion which rotatably holds the planetary carrier and to which the magnetic internal gear is secured; the multiple rotary shafts are held by the planetary carrier such that they can move in the axial direction thereof with respect to the planetary carrier; the planetary carrier is held by the main body portion such that it can move in the axial direction with respect to the main body portion; when one of the multiple rotary shafts is set as a primary rotary shaft and the remaining rotary shafts, the primary rotary shaft excluded, are set as secondary rotary shafts, the total length of a gap in the axial direction between the primary rotary shaft and the planetary carrier on one end in the axial direction and a gap in the axial direction between the primary rotary shaft and the planetary carrier on the other end in the axial direction is smaller than the total length of a gap in the axial direction between the secondary rotary shafts and the planetary carrier on one end in the axial direction and a gap in the axial direction between the secondary rotary shafts and the planetary carrier on the other end in the axial direction, and the total length of a gap in the axial direction between the planetary carrier and the main body portion on one end in the axial direction; when the primary rotary shaft and the planetary carrier are in contact in the axial direction, a gap is to be created in the axial direction between the secondary rotary shafts and the planetary carrier and between the planetary carrier and the main body portion on both ends in the axial direction.

In at least an embodiment of the present invention, the magnetic center in the axial direction of the magnetic sun gear and the magnetic internal gear coincides in the axial direction with the magnetic center in the axial direction of the magnetic planetary gear; the external force in the axial direction exerted on the planetary carrier is less than the magnetic attraction in the axial direction working between the magnetic sun gear, the magnetic internal gear and the magnetic planetary gear fixed to the primary rotary shaft.

In the planetary gear speed reduction device of at least an embodiment of the present invention, the total length of the gap in the axial direction between the primary rotary shaft and the planetary carrier on one end in the axial direction and the gap in the axial direction between the primary rotary shaft and the planetary carrier on the other end in the axial direction is smaller than the total length of the gap in the axial direction between the secondary rotary shafts and the planetary carrier on one end in the axial direction and the gap in the axial direction between the secondary rotary shafts and the planetary carrier on the other end side in the axial direction, and the total length of the gap in the axial direction between the planetary carrier and the main body portion on one end in the axial direction and the gap in the axial direction between the planetary carrier and the main body portion on the other end in the axial direction. Also, in at least an embodiment of the present invention, when the primary rotary shaft and the planetary carrier are in contact in the axial direction, a gap is to be created between the secondary rotary shafts and the planetary carrier on both ends in the axial direction. Therefore, in at least an embodiment of the present invention, if the magnetic center in the axial direction of the magnetic sun gear and the magnetic internal gear coincides with the magnetic center in the axial direction of the magnetic planetary gears, even when friction loss occurs between one rotary shaft (the primary rotary shaft) and the planetary carrier, no friction loss in the axial direction will occur between the remaining rotary shafts and the planetary carrier. Therefore, in at least an embodiment of the present invention, friction loss in the planetary gear speed reduction device in the axial direction of the rotary shafts can be reduced.

In at least an embodiment of the present invention, when the primary rotary shaft and the planetary carrier are in contact in the axial direction, a gap is to be created in the axial direction between the planetary carrier and the main body portion on both ends in the axial direction. Therefore, in at least an embodiment of the present invention, when the magnetic center in the axial direction of the magnetic sun gear and the magnetic internal gear coincides with the magnetic center in the axial direction of the magnetic planetary gears and the external force in the axial direction exerted on the planetary carrier is less than the magnetic attraction in the axial direction working between the magnetic sun gear, the magnetic internal gear and the magnetic planetary gear which is secured to the primary rotary shaft, the planetary carrier and the main body portion won't make contact with one another in the axial direction, and thus friction loss won't occur between the planetary carrier and the main body portion in the axial direction. Therefore, in at least an embodiment of the present invention, friction loss in the planetary gear speed reduction device in the axial direction of the rotary shaft can be reduced.

To achieve the above, the planetary gear speed reduction device of at least an embodiment of the present invention comprises a magnetic sun gear, multiple magnetic planetary gears which revolve around the magnetic sun gear while rotating on the axes thereof, a magnetic internal gear which is arranged to surround multiple magnetic planetary gears from the outer circumferential side, multiple rotary shafts to which the multiple magnetic planetary gears are respectively secured, a planetary carrier which rotatably holds the multiple rotary shafts, and a main body portion which rotatably holds the planetary carrier and to which the magnetic internal gear is secured; the multiple rotary shafts are held by the planetary carrier such that the rotary shafts can move in the axial direction with respect to the planetary carrier; the planetary carrier is held by the main body portion such that the planetary carrier can move in the axial direction with respect to the main body portion; the total length of the gap in the axial direction between the planetary carrier and the main body portion on one end in the axial direction and the gap in the axial direction between the planetary carrier and the main body portion on the other end in the axial direction is smaller than the total length of the gap in the axial direction between the rotary shaft and the planetary carrier on one end in the axial direction and the gap in the axial direction between the rotary shaft and the planetary carrier on the other end in the axial direction; when the planetary carrier and the main body portion is in contact in the axial direction, a gap is to be created in the axial direction between the rotary shaft and the planetary carrier on both ends in the axial direction.

For example, in at least an embodiment of the present invention, the magnetic center of the magnetic sun gear and the magnetic internal gear in the axial direction coincides in the axial direction with the magnetic center of the magnetic planetary gear in the axial direction, and the external force in the axial direction exerted on the planetary carrier is larger than the magnetic attraction in the axial direction working between the magnetic sun gear, the magnetic internal gear and one magnetic planetary gear.

In the planetary gear speed reduction device of at least an embodiment of the present invention, the total length of the gap in the axial direction between the planetary carrier and the main body portion on one end in the axial direction and the gap in the axial direction between the planetary carrier and the main body portion on the other end in the axial direction is smaller than the total length of the gap in the axial direction between the rotary shafts and the planetary carrier on one end in the axial direction and the gap in the axial direction between the rotary shafts and the planetary carrier on the other end in the axial direction; when the planetary carrier and the main body portion are in contact in the axial direction, a gap is to be created between the rotary shafts and the planetary carrier on both ends in the axial direction. Therefore, in at least an embodiment of the present invention, if the magnetic center of the magnetic sun gear and the magnetic internal gear in the axial direction coincides in the axial direction with the magnetic center of the magnetic planetary gears in the axial direction, although friction loss in the axial direction may occur between the main body portion and the planetary carrier, no axial friction loss will occur between the multiple rotary shafts and the planetary carrier. Therefore, in at least an embodiment of the present invention, friction loss of the rotary shafts in the axial direction can be reduced.

In at least an embodiment of the present invention, the outside diameter of the magnetic sun gear and the outside diameter of the magnetic planetary gears may be equal. With this configuration, the magnetic planetary gears which are arranged next to each other on the outer circumferential side of the magnetic sun gear can be more distanced, preventing magnetic interference between the adjacently-arranged magnetic planetary gears. Therefore, the efficiency in transmitting the force between the magnetic sun gear and the magnetic planetary gears can be increased.

In at least an embodiment of the present invention, the planetary gear speed reduction device is equipped with a single magnetic sun gear and four magnetic planetary gears which are arranged at a pitch of 90° around the magnetic sun gear. In this case, the magnetic sun gear and the magnetic planetary gears may be formed in the same shape and that the number of magnetic poles of the outer circumferential surface of the magnetic sun gear and the number of magnetic poles of the outer circumferential surface of each of the magnetic planetary gears be equal. Also, in this case, the reduction rate of the planetary gear speed reduction device may be one-fourth. By configuring the device this way, the magnetic sun gear and the magnetic planetary gears can be in a common use; therefore, the number of different kinds of components used in the planetary gear speed reduction device can be reduced.

The planetary gear speed reduction device of at least an embodiment of the present invention can be used in a driving mechanism which is equipped with a motor, which is connected to the input side of the planetary gear speed reduction device and connected with the magnetic sun gear by the output shaft thereof. In this driving mechanism, friction loss can be reduced in the axial direction of the rotary shafts of the planetary gear speed reduction device. Also, in this driving mechanism, the output shaft of the motor is connected to the magnetic sun gear of the planetary gear speed reduction device, and the magnetic planetary gear speed reduction device is arranged at the position at which the rotation speed is relatively fast; therefore, the driving mechanism can be made quieter.

As described above, in the magnetic planetary gear speed reduction device of at least an embodiment of the present invention equipped with the magnetic sun gear and the magnetic planetary gears, the efficiency in transmitting the force between the magnetic sun gear and the magnetic planetary gears can be increased. Also, the driving mechanism can be made quieter in at least an embodiment of the present invention.

Also, in the magnetic planetary gear speed reduction device of at least an embodiment of the present invention equipped with the magnetic sun gear and the magnetic planetary gears, friction loss can be reduced in the axial direction of the rotary shafts to which the magnetic planetary gears are secured. Also, the driving mechanism in at least an embodiment of the present invention can be made quieter.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 6(A) is an enlarged view of a portion corresponding to the F portion in FIG. 2; FIG. 6(B) is an enlarged view of a portion corresponding to the G portion in FIG. 2.

DETAILED DESCRIPTION

Figure 1:
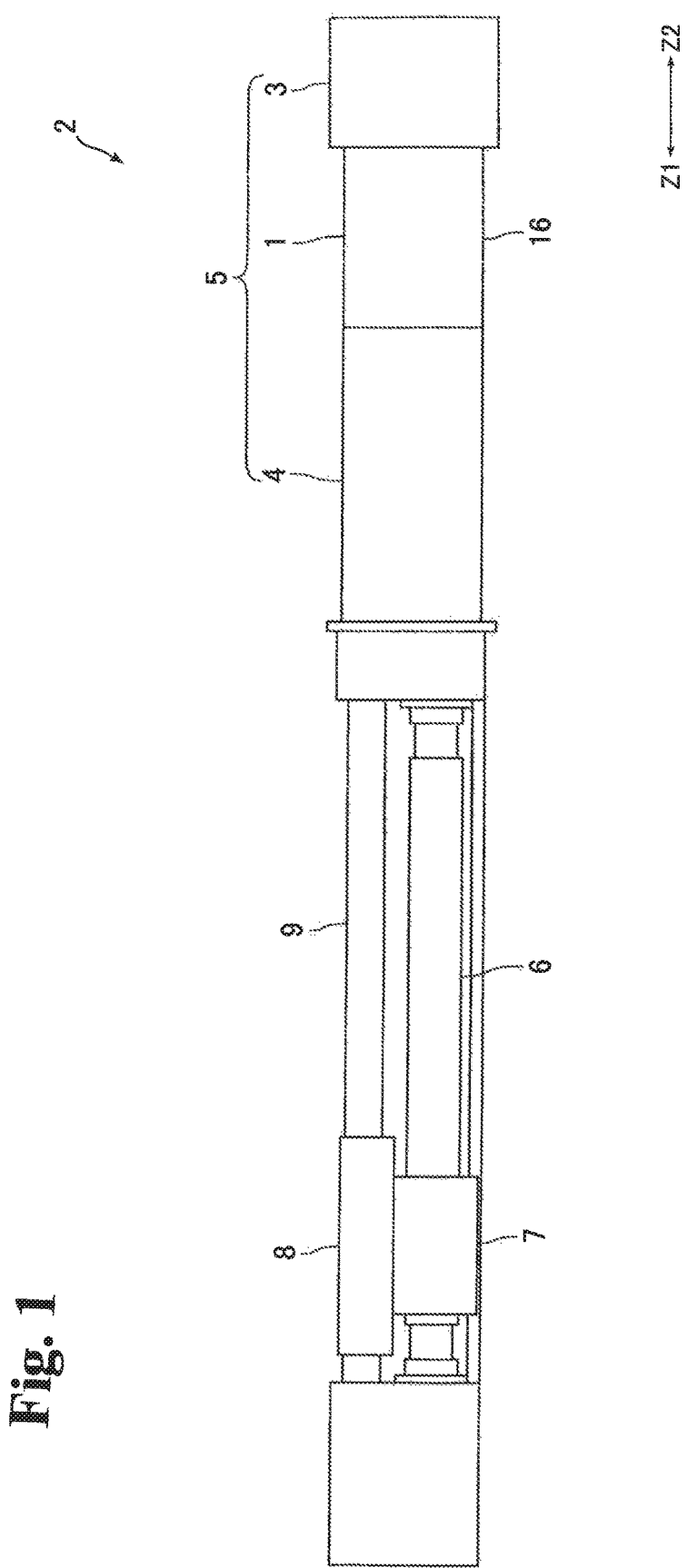
FIG. 1 is a side view of a driving unit which is equipped with a planetary gear speed reduction device of an embodiment of the present invention.

Embodiments of the present invention are described hereinafter referring to the drawings.

(Configuration of Driving Unit)

Figure 2:
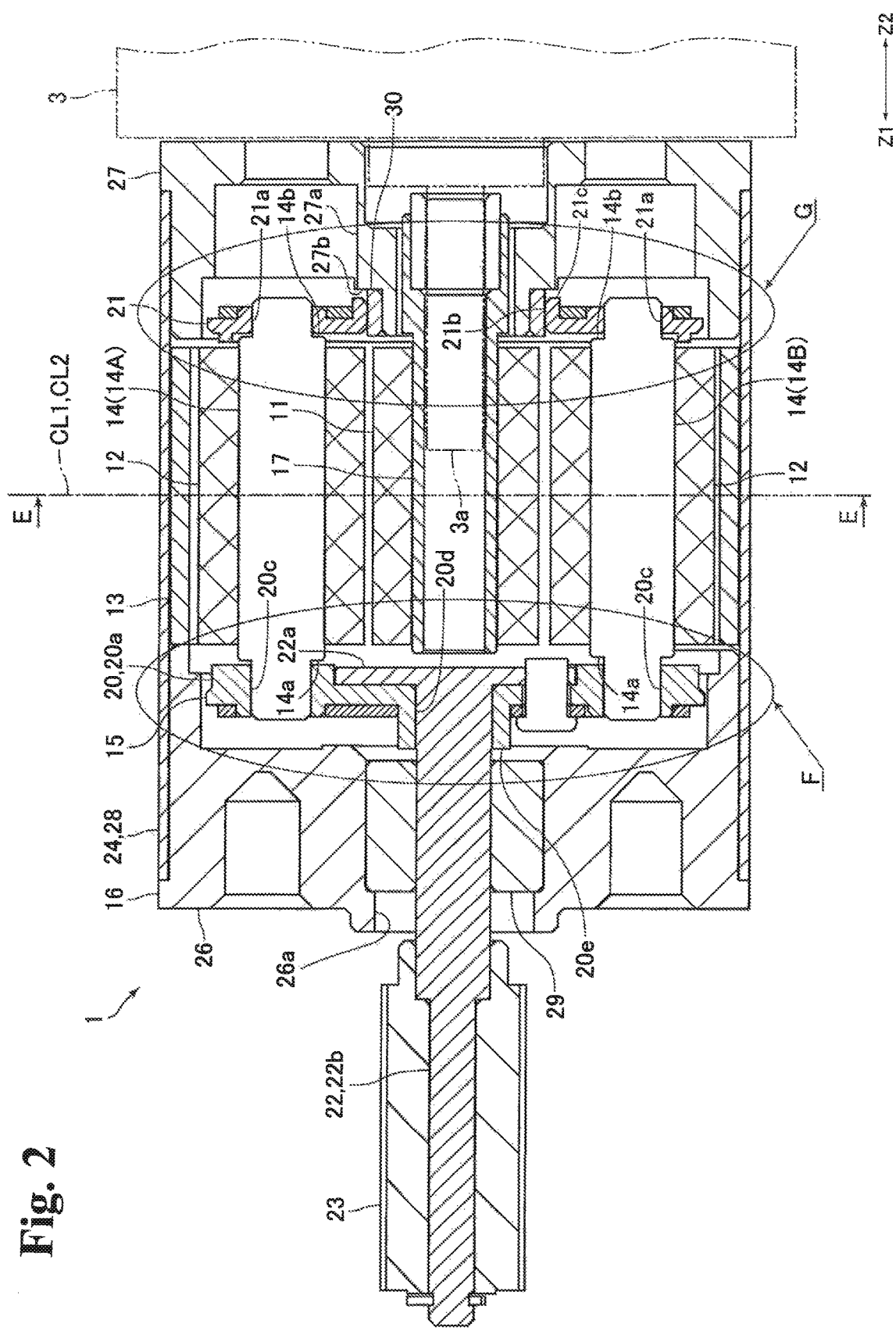
FIG. 2 is a cross-sectional view of the planetary gear speed reduction device shown in FIG. 1.
Figure 3:
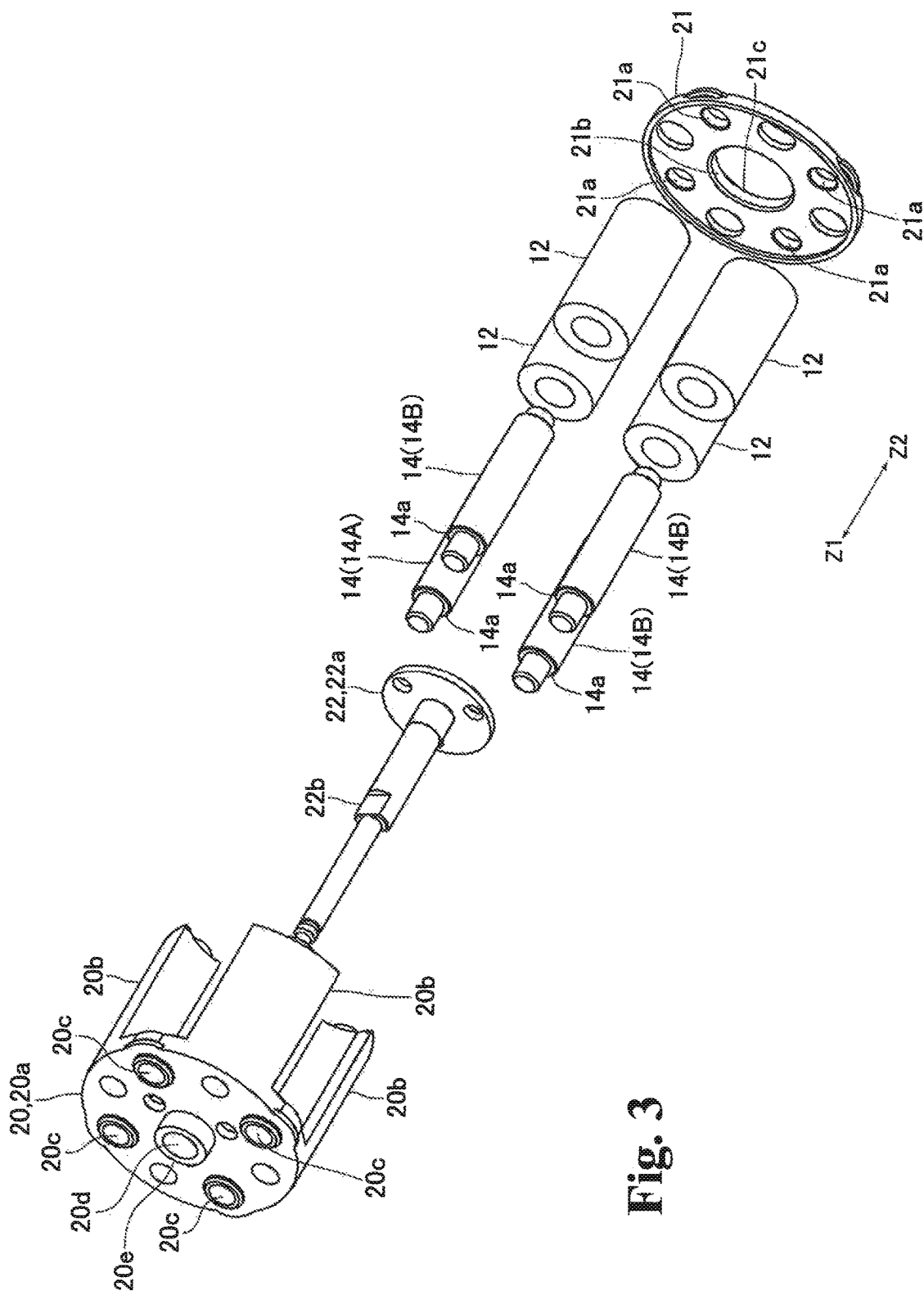
FIG. 3 is an exploded perspective view of a portion of the planetary gear speed reduction device shown in FIG. 2.
Figure 4:
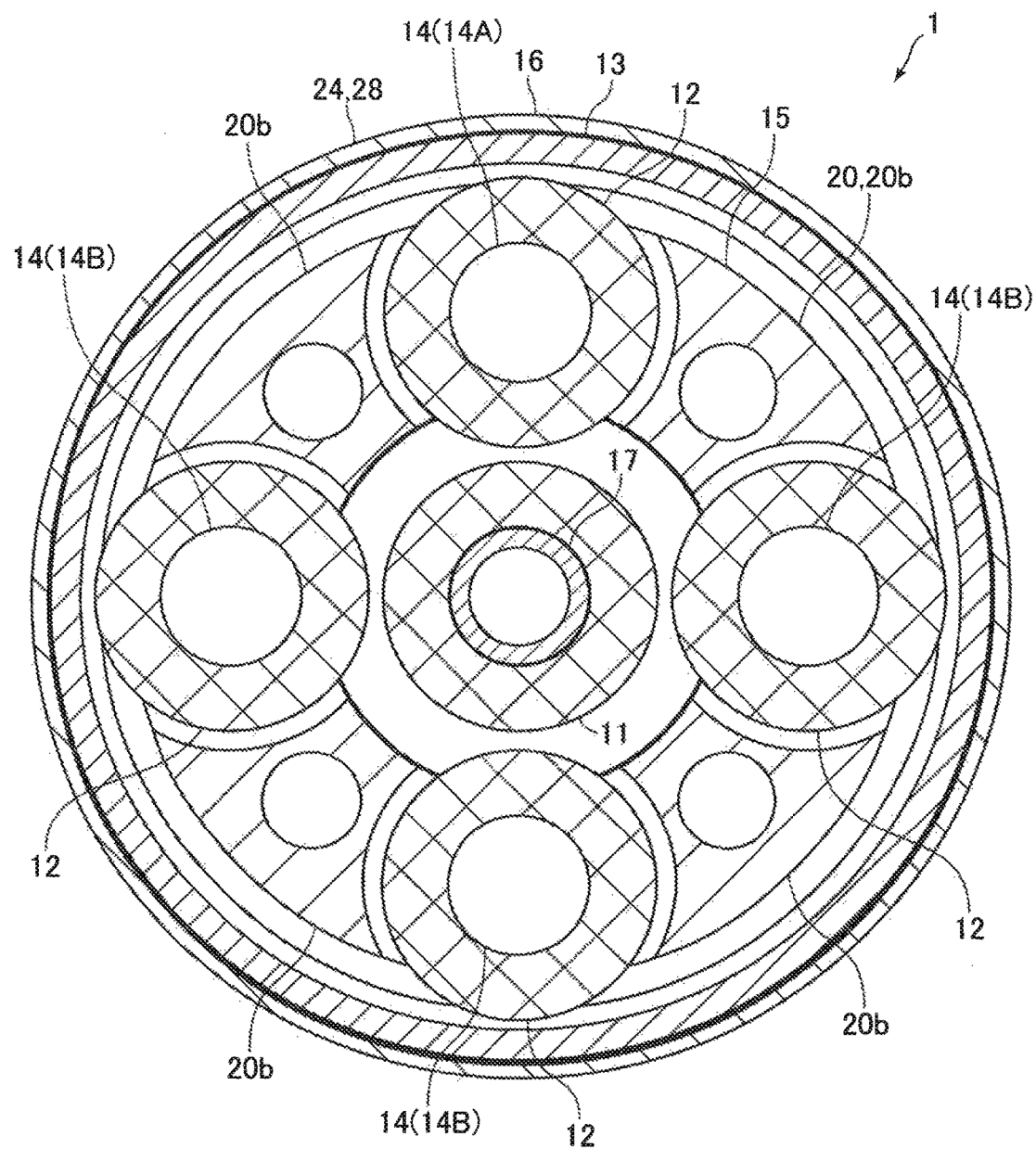
FIG. 4 is a cross-sectional view of an E-E cross section of FIG. 2.

FIG. 1 is a side view of a driving unit 2 which is equipped with a planetary gear speed reduction device 1 of an embodiment of the present invention. FIG. 2 is a cross-sectional view of the planetary gear speed reduction device 1 shown in FIG. 1. FIG. 3 is an exploded perspective view of a portion of the planetary gear speed reduction device 1 shown in FIG. 2. FIG. 4 is a cross-sectional view of an E-E cross section in FIG. 2.

The planetary gear speed reduction device 1 (hereinafter denoted as "speed reduction device 1") configures a portion of a driving unit 2 which operates predetermined objects-to-be-operated (no illustration). The driving unit 2 is equipped with a motor 3 which is connected to the input side of the speed reduction device 1 and a speed reduction device 4 which is connected to the output side of the speed reduction device 1. In this embodiment, a driving mechanism 5 is configured by the speed reduction device 1, the motor 3 and the speed reduction device 4. Also, the driving unit 2 is equipped with a screw member 6 connected to an output shaft of the speed reduction device 4, a nut member 7 engaged with the screw member 6, a sliding member 8 to which the nut member 7 and an object-to-be-operated are fixed, and a guide shaft 9 for guiding the sliding member 8.

Note that in the description below, the Z1 direction side in FIG. 1, etc. is the "front" side and the Z2 direction side of FIG. 1, etc. is the "rear" side. In this embodiment, the motor 3, the speed reduction device 1 and the speed reduction device 4 are arranged in this order from the rear side toward the front side. Also, the screw member 6, the nut member 7, the sliding member 8 and the guide shaft 9 are arranged on the front side of the speed reduction device 4.

The speed reduction device 1 is a magnetic planetary gear speed reduction device and is equipped with a cylindrical magnetic sun gear 11 (hereinafter denoted as "sun gear 11") which is made from a permanent magnet, multiple cylindrical magnetic planetary gears 12 (hereinafter denoted as "planetary gears 12") which are made from permanent magnet, and a magnetic cylindrical internal gear 13 (hereinafter denoted as "internal gear 13") which is made from a permanent magnet. The speed reduction device 1 is also equipped with multiple rotary shafts 14 to which the multiple planetary gears 12 are respectively secured, a planetary carrier 15 which rotatably holds the multiple rotary shafts 14, and a main body portion 16 which rotatably holds the planetary carrier 15 and to which the internal gear 13 is secured. The speed reduction device 1 of this embodiment is equipped with four planetary gears 12 and four rotary shafts 14; the four rotary shafts 14 are rotatably held by the planetary carrier 15.

The sun gear 11 is fixed to the outer circumferential surface of a cylindrical holding member 17. The holding member 17 is arranged such that the axial direction of thereof coincides with the front-rear direction; the sun gear 11 is fixed to the holding member 17 while the front end side of the holding member 17 is inserted to the inner circumferential side of the sun gear 11. To the holding member 17 an output shaft 3a of the motor 3 is fixed. More specifically described, the output shaft 3a is fixed to the inner circumferential surface of the holding member 17 while being inserted to the inner circumferential side of the holding member from the back. In other words, the output shaft 3a of the motor 3 is connected to the sun gear 11 via the holding member 17.

The planetary gears 12 are secured to the outer circumferential surface of the rotary shafts 14. More specifically described the planetary gears 12 are secured to the rotary shafts 14 while the rotary shafts 14 are inserted to the inner circumferential side of the planetary gears 12. The rotary shafts 14 are arranged such that the axial direction thereof coincides with the front-rear direction. Each of the rotary shafts 14 is formed in a long and narrow cylindrical shape with a small step, in which the outside diameter of the front end portion and the rear end portion of the rotary shaft 14 is smaller than the outside diameter of the middle portion of the rotary shaft 14 in the front-rear direction. Thus, formed on the front end of the rotary shaft 14 is a step surface 14a facing toward the front, and formed on the rear end of the rotary shaft 4 is a step surface 14b facing toward the rear side. The step surface 14a, 14b is formed to be a plane orthogonal to the front-rear direction and to be annular.

As shown in FIG. 4, the four planetary gears 12 are arranged at a pitch of 90° around the sun gear 11. Also, the four planetary gears 12 are arranged concentric to the sun gear 11; an equal gap is created between the outer circumferential surface of the sun gear 11 and the outer circumferential surface of each of the four planetary gears 12. The four planetary gears 12 are arranged at the same position in the front-rear direction; the magnetic centers of the four planetary gears 12 in the front-rear direction coincide with one another in the front-rear direction. The magnetic center of each of the planetary gears 12 in the front-rear direction is hereinafter denoted as the "magnetic center CL1".

In this embodiment, the outside diameter of the sun gear 11 and the outside diameter of the planetary gears 12 are equal. In this embodiment, the sun gear 11 and the planetary gears 12 are formed in the same shape. In other words, the length of the sun gear 11 in the front-rear direction is equal to the length of the planetary gears 12 in the front-rear direction. The inside diameter of the sun gear 11 and the outside diameter of the planetary gears 12 are also equal; the outside diameter of the portion of the rotary shaft 14, which is inserted to the inner circumferential side of the sun gear 11, is equal to the outside diameter of the portion of the rotary shaft 14, which is inserted to the inner circumferential side of the planetary gear 12. Further, in this embodiment, the number of magnetic poles which are given on the outer circumferential surface of the sun gear 11 is equal to the number of magnetic poles given to the outer circumferential surface of each of the planetary gears 12.

The internal gear 13 is arranged to surround the four planetary gears 12 from the outer circumferential side. The internal gear 13 is also arranged coaxially to the sun gear 11, and a gap is created equally between the inner circumferential surface of the internal gear 13 and the outer circumferential surface of each of the four planetary gears 12. The length of the internal gear 13 in the front-rear direction is equal to the length of the sun gear 11 in the front-rear direction. The sun gear 11 and the internal gear 13 are arranged in the same position in the front-rear direction. In this embodiment, also, the magnetic center of the sun gear 11 in the front-rear direction coincides in the front-rear direction with the magnetic center of the internal gear 13 in the front-rear direction. Hereinafter, the magnetic center of the sun gear 11 and the internal gear 13 in the front-rear direction is noted as "magnetic center CL2".

As described above, the internal gear 13 is secured to the main body portion 16. Therefore, as the sun gear 11 rotates, the four planetary gears 12 rotate with respect to the planetary carrier 15 and the planetary carrier 15 rotates with respect to the main body portion 16. In other words, as the sun gear 11 rotates, the four planetary gears 12 revolve around the sun gear 11 while rotating on the axes thereof. In this embodiment, the number of magnetic poles given around the inner circumferential surface of the internal gear 13 is three times of the number of magnetic poles on the outer circumferential surface of the sun gear 11. Therefore, in this embodiment, the reduction rate of the speed reduction device 1 is one-fourth.

The planetary carrier 15 holds the four rotary shafts 14 such that the four rotary shafts 14 can move in the front-rear direction with respect to the planetary carrier 15. The planetary carrier 15 is equipped with a holding member 20 for holding the small diameter portions of the rotary shafts 14 on the front end, a holding member 21 for holding the small diameter portions of the rotary shafts 14 on the rear end, and an output shaft 22 secured to the holding member 20. The holding member 20 is configured by a disc-like end plate portion 20a and four protruding portions 20b which protrude to the rear side from the end plate portion 20a. The holding member 21 is formed in a disc shape. The output shaft 22 is configured by a disc-like fixing portion 22a which is fixed to the holding member 20 and a shaft portion 22b which projects to the front side from the fixing portion 22a.

The end plate portion 20a is arranged such that the thickness direction thereof coincides with the front-rear direction. Formed in the end plate portion 20a are four through-holes 20c, through which the small diameter portions of the rotary shafts 14 on the front end are inserted, and a through-hole 20d into which the shaft portion 22b of the output shaft 20a is inserted. Also, in the center of the end plate portion 20a, a cylindrical protruding portion 20e protruding to the front is formed. The through-hole 20d is formed in the center of the end plate portion 20a and the inner circumferential surface of the protruding portion 20e is made as the through-hole 20d.

The four through-holes 20c are formed at a pitch of 90° with respect to the center of the end plate portion 20. As shown in FIG. 4, the four protruding portions 20b are arranged at a pitch of 90° around the end plate portion 20a. Also, the protruding portions 20b are arranged so as to connect with the outer circumferential portion of the end plate portion 20a. The protruding portions 20b are arranged between the through-holes 20c in the circumferential direction of the end plate portion 20a.

The holding member 21 is arranged such that the thickness direction thereof coincides with the front-rear direction. The holding member 21 is fixed to the protruding portions 20b while making contact with the rear end surfaces of the protruding portions 20b. In the holding member 21, the four through-holes 21a, through which the small diameter portions of the rotary shafts 14 on the rear end side are inserted, are formed. The four through-holes 21a are formed at a pitch of 90° around the holding member 21. Also, in the center of the holding member 21, a cylindrical protruding portion 21c protruding to the rear side is formed; the inner circumferential surface of the protruding portion 21c is made as the through-hole 21b passing through in the front-rear direction.

The output shaft 22 is fixed to the holding member 20 with the shaft portion 22b being inserted into the through-hole 20d from the rear side and with the front face of the fixing portion 22a being in contact with the back face of the end plate portion 20a. The front end potion of the shaft portion 22b protrudes to the front from the main body portion 16. A gear 23 is secured on the front side of the shaft portion 22b. The gear 23 is a mechanical gear having multiple teeth around the outer circumferential surface thereof. More specifically, the gear 23 is a spur gear.

The main body portion 16 holds the planetary carrier 15 such that the planetary carrier 15 can move in the front-rear direction with respect to the main body portion 16. The main body portion 16 is equipped with a main body frame 24 and bearings 29 and 30. As shown in FIG. 2, the main body frame 24 is configured by a first frame [portion] 26 which configures the front end portion of the main body frame 24, a second frame [portion] 27 which configures the rear end portion of the main body frame 24, and a cover member 28 which connects the first frame [portion] 26 and the second frame [portion] 27. In the center of the first frame [portion] 26, a through-hole 26a passing through in the front-rear direction is formed. The bearing 29 is formed to be cylindrical, and the outer circumferential surface of the bearing 29 is secured to the through-hole 26a. On the inner circumferential side of the bearing 29, a shaft portion 22b of the output shaft 22 is inserted; the shaft portion 22b is rotatably held by the bearing 29.

In the center of the second frame [portion] 27, a cylindrical protruding portion 27a protruding toward the front is formed. On the inner circumferential side of the protruding portion 27a, the rear end of the holding member 27 is positioned. The bearing 30 is formed to be cylindrical, and the inner circumferential surface of the bearing 30 is secured to the outer circumferential surface on the front end side of the protruding portion 27a. The bearing 30 is inserted through the through-hole 21b of the holding member 21, and the holding member 21 is rotatably held by the bearing 30. Formed on the front end of the protruding portion 27a is a contact surface 27b with which the rear end surface of the bearing 30 makes contact. The contact surface 27b is formed to be plane which intersect orthogonally with the front-rear direction and also formed to be annular. The outside diameter of the contact surface 27b is larger than the outside diameter of the bearing 30, and the rear end surface of the protruding portion 21c of the holding member 21 can make contact with the contact surface 27b.

The cover member 28 is formed to be annular and fixed to the first frame [portion] 26 and the second frame [portion] 27, covering the outer circumferential surface of the first frame [portion] 26 and the outer circumferential surface of the second frame [portion] 27. The front end surface of the internal gear 13 is in contact with the rear end face of the first frame [portion] 26, and the internal gear 13 is arranged on the inner circumferential side of the cover member 28.

The speed reduction device 4 is equipped with a gear train (no illustration) including an input gear with which the gear 23 engages. Each gear that configures the gear train is a mechanical gear having multiple teeth around the outer circumferential surface thereof; the speed reduction device 4 is a mechanical reduction gear. More specifically, each gear configuring the gear train is a spur gear, and the speed reduction device 4 is a parallel axes reduction gear. Note that the speed reduction device 4 may be a planetary gear speed reduction device.

The screw member 6 is a trapezoidal screw thread, for example. A male thread is formed on the outer circumferential surface of the screw member 6. The screw member 6 is arranged such that the axial direction thereof coincides with the front-rear direction. The screw member 6 is rotatably held by a frame of the driving unit 2. To the rear end of the screw member 6, a gear (no illustration) which engages with the output teeth of the speed reduction device 4 is secured. The nut member 7 is formed cylindrically; on the inner circumferential surface of the nut member 7, a female thread which engages with the male thread of the screw member 6 is formed.

The guide shaft 9 is fixed to the frame of the driving unit 2 to be parallel to the screw member 6. In other words, the guide shaft 9 is fixed to the fame of the driving unit 2 such that the axial direction thereof coincides with the front-rear direction. A through-hole into which the guide shaft 9 is inserted is formed in the sliding member 8. As the screw member 6 turns, the sliding member 8 moves together with the nut member 7 along the guide shaft in a straight line in the front-rear direction. In other words, as the screw member 6 turns, an object-to-be-moved which is fixed to the sliding member 8 moves along the guide shaft 9 in a straight line in the front-rear direction.

(Positional Relationship in the Axial Direction Between Rotary Shafts and Planetary Carrier)

Figure 5A:
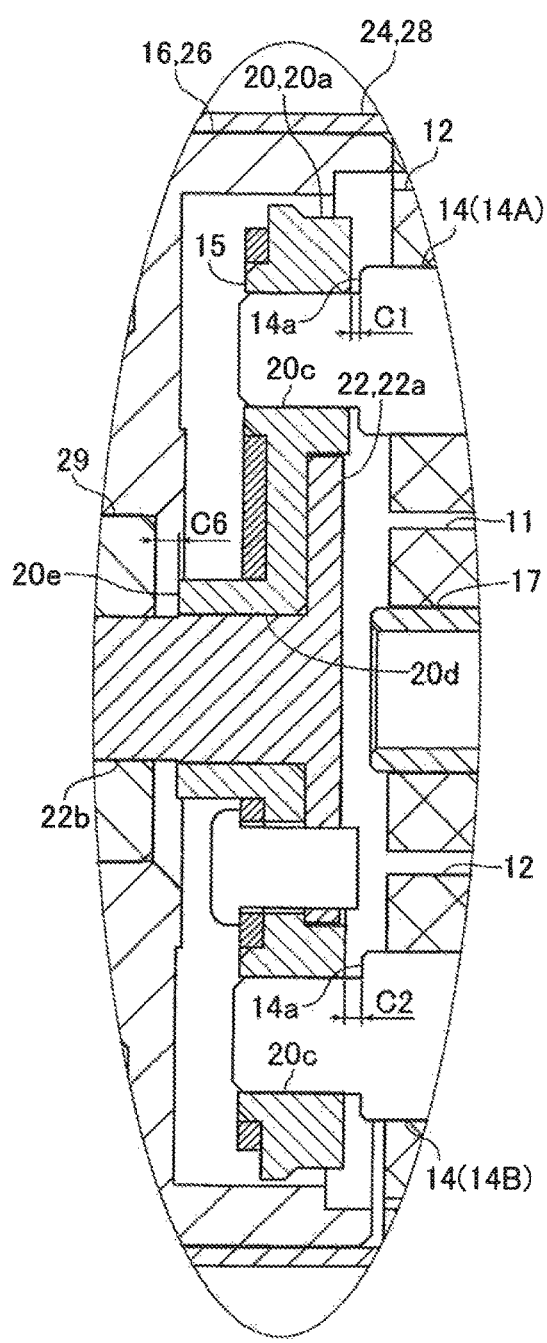
FIG. 5(A) is an enlarged view of an F section of FIG. 2.
Figure 5B:
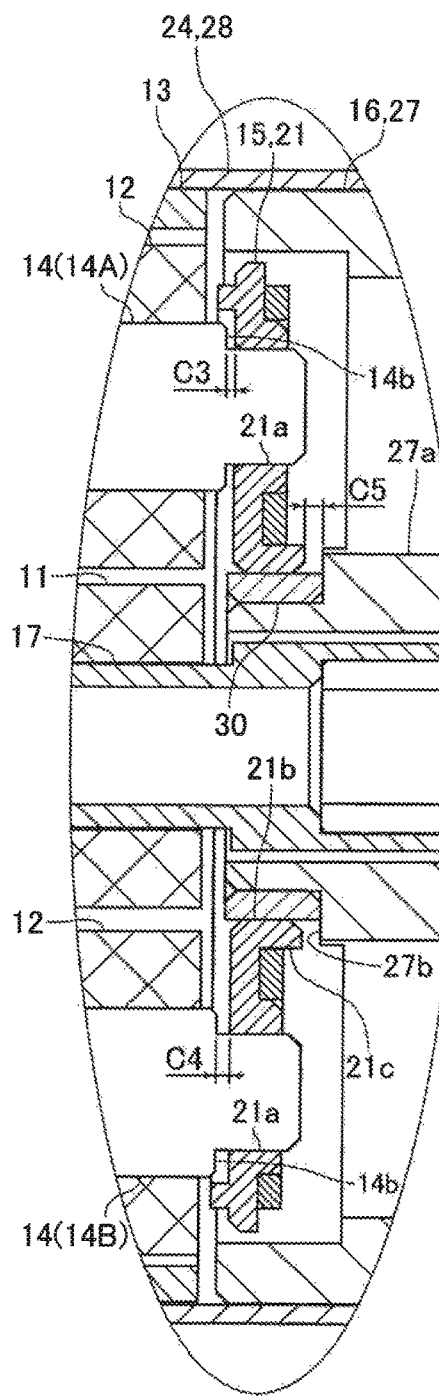
FIG. 5(B) is an enlarged view of a G section of FIG. 2.

FIG. 5(A) is the enlarged view of the F portion of FIG. 2; FIG. 5(B) is the enlarged view of the G portion of FIG. 2.

In this embodiment, the external force exerted on the planetary carrier 15 in the front-rear direction is less than magnetic attraction in the front-rear direction working between the sun gear 11, the internal gear 13 and one planetary gear 12. In other words, the external force in the front-rear direction exerted on the planetary carrier 15 is less than the magnetic force in the front-rear direction working among the planetary gear 12, which is secured to the primary rotary shaft 14A which will be described later, the sun gear 11 and the internal gear 13. Also, in this embodiment, as shown in FIG. 2, the magnetic center CL1 of the planetary gears 12 coincides in the front-rear direction with the magnetic center CL2 of the sun gear 11 and the internal gear 13

Note that the gear 23 of this embodiment is a spur gear, for example; since almost no external force in the front-rear direction is exerted on the gear 23, almost no external force in the front-rear direction exerts on the planetary carrier 15 if the driving unit 2 is installed such that the front-rear direction coincides with the horizontal direction. Even when the driving unit 2 is installed with the front-rear direction inclining to the horizontal direction, only the external force due to the gravity of the planetary carrier 15 and the gear 23 exerts on the planetary carrier 15 in the front-rear direction. Therefore, as described above, in this embodiment, the external force in the front-rear direction exerted on the planetary carrier 15 is less than the magnetic attraction in the front-rear direction working between the sun gear 11, the internal gear 13 and one planetary gear 12.

When one of the rotary shafts 14 is set as the primary rotary shaft 14A and the remaining three rotary shafts 14 are respectively set as the secondary rotary shafts 14B, the length of the large diameter portion from the step surface 14a to the step surface 14b of the primary rotary shaft 14A is longer than the length of the large diameter portion from the step surface 14a to the step surface 14b of the secondary rotary shaft 14B. In this embodiment, when a gap is created in the front-rear direction between the primary rotary shaft 14A and the planetary carrier 15 on both ends in the front-rear direction, a gap C1 between the step surface 14a of the primary rotary shaft 14A and the rear surface of the end plate portion 20a in the front-rear direction is smaller than a gap C2 between the step surface 14a of the secondary rotary shaft 14B and the rear surface of the end plate portion 20a in the front-rear direction on the front side of the speed reduction device 1, as shown in FIG. 5(A); on the rear side of the speed reduction device 1, as shown in FIG. 5(B), a gap C3 between the step surface 14b of the primary rotary shaft 14A and the front surface of the holding member 21 in the front-rear direction is smaller than a gap C4 between the step surface 14b of the secondary rotary shaft 14B and the front surface of the holding member 21 in the front-rear direction.

In other words, in this embodiment, the total length of the gap C1 in the front-rear direction between the primary rotary shaft 14A and the planetary carrier 15 on the front side and the gap C3 in the front-rear direction between the primary rotary shaft 14A and the planetary carrier 15 on the rear side is smaller than the total length of the gap C2 in the front-rear direction between the secondary rotary shaft 14B and the planetary carrier 15 on the front side and the gap C4 in the front-rear direction between the secondary rotary shaft 14B and the planetary carrier 15 on the rear side.

Also, when a gap in the front-rear direction is created between the primary rotary shaft 14A and the planetary carrier 15 on both ends in the front-rear direction, the gap C1 is smaller than a gap C5 created in the front-rear direction between the rear end surface of the protruding portion 21c and the contact surface 27b (see FIG. 5(B)), and the gap C3 is smaller than a gap C6 created in the front-rear direction between the front end surface of the protruding portion 20e and the rear end surface of the bearing 29 (see FIG. 5(A)). In other words, the total length of the gap C1 in the front-rear direction between the primary rotary shaft 14A and the planetary carrier 15 on the front side and the gap C3 in the front-rear direction between the primary rotary shaft 14A and the planetary carrier 15 on the rear side is smaller than the total length of the gap C6 in the front-rear direction between the planetary carrier 15 and the main body portion 16 on the front side and the gap C5 in the front-rear direction between the planetary carrier 15 and the main body portion 16 on the rear side.

For this reason, when the step surface 14a of the primary rotary shaft 14A is in contact with the rear surface of the end plate portion 20a, or the step surface 14b of the primary rotary shaft 14A is in contact with the front surface of the holding member 21, a gap is created between the step surface 14a of the secondary rotary shafts 14B and the rear end of the end plate portion 20a, a gap is created between the step surface 14b of the secondary rotary shafts 14B and the front surface of the holding member 21, a gap is created between the rear end surface of the protruding portion 21c and the contact surface 27b, and a gap is created between the front end surface of the protruding portion 20e and the rear end surface of the bearing 29. In other words, when the primary rotary shaft 14A and the planetary carrier 15 are in contact with each other in the front-rear direction, the gap is created between the secondary rotary shafts 14B and the planetary carrier 15 and also between the planetary carrier 15 and the main body portion 16 on both ends of the speed reduction device 1 in the front-rear direction.

As described above, in this embodiment, the external force exerted on the planetary carrier 15 in the front-rear direction is less than the magnetic attraction in the front-rear direction working between the sun gear 11, the internal gear 13 and the planetary gear 12 secured to the primary rotary shaft 14A. Therefore, the planetary carrier 15 will never move further to the rear side from the state in which the step surface 14a of the primary rotary shaft 14A and the rear surface of the end plate portion 20a are in contact. Also, the planetary carrier 15 will never move further to the front side from the state in which the step surface 14b of the first rotary shaft 14A and the front surface of the holding member 21 are in contact. Therefore, the rear end surface of the protruding portion 21c and the contact surface 27b will not make contact with each other, and the front end surface of the protruding portion 20e and the rear end surface of the bearing 29 will not make contact with each other.

(Effects of This Embodiment)

As described above, the large diameter of the sun gear 11 and the large diameter of the planetary gear 12 are equal. Therefore, in this embodiment, it is possible to distance the adjacent planetary gears around the outer circumferential direction of the sun gear 11, thus making is possible to prevent magnetic interference between the planetary gears 12 which are adjacently arranged in the circumferential direction. Therefore, in this embodiment, the efficiency in transmitting the force between the sun gear 11 and the planetary gears 12 can be increased.

In this embodiment, the sun gear 11 and the planetary gears 12 are formed in the same shape. Also, in this embodiment, the number of magnetic poles given around the outer circumferential surface of the sun gear 11 is equal to the number of magnetic pole given to the outer circumferential surface of each of the planetary gears 12. Further, in this embodiment, the reduction rate of the speed reduction device 1 is one-fourth. For this reason, in this embodiment, the sun gear 11 and the planetary gears 12 can be in common use. Therefore, in this embodiment, the number of different kinds of components used to configure the speed reduction device 1 can be reduced. Also, in this embodiment, the output shaft 3a of the motor 3 is connected to the sun gear 11 and the speed reduction device 1 is arranged at a position at which the rotation speed is relatively fast; therefore, the driving unit 2 can be made quieter.

(Major Effects of This Embodiment)

As described above, a gap is created in the front-rear direction between the secondary rotary shafts 14B and the planetary carrier 15 on both ends of the speed reduction device 1 in the front-rear direction when the primary rotary shaft 14A and the planetary carrier 15 are in contact with each other in the front-rear direction. In this embodiment, the magnetic center CL1 coincide in the front-rear direction with the magnetic center CL2 of the sun gear 11 and the internal gear 13. Therefore, according to this embodiment, even when friction loss in the front-rear direction occurs between one of the rotary shafts 14 (the primary rotary shaft 14A, more specifically) and the planetary carrier 15, no friction loss occurs between the remaining three secondary rotary shafts 14B and the planetary carrier 15 in the front-rear direction. Therefore, according to this embodiment, friction loss of the speed reduction device 1 in the front-rear direction (that is, in the axial direction of the rotary shafts 14) can be reduced.

Also, in this embodiment, the external force exerted on the planetary carrier 15 in the front-rear direction is less than the magnetic attraction in the front-rear direction working between the sun gear 11, the internal gear 13 and the planetary gear 12 fixed to the primary rotary shaft 14A; as described above, the rear end surface of the protruding portion 21c and the contact surface 27b will not make contact with each other and the front end surface of the protruding portion 20e and the bearing 29 will not make contact with each other. Therefore, in this embodiment, friction loss in the front-rear direction does not occur between the planetary carrier 15 and the main body portion 16. Consequently, in this embodiment, friction loss in the front-rear direction in the speed reduction device 1 can be reduced.

In this embodiment, the outside diameter of the sun gear 11 and the outside diameter of the planetary gears 12 are equal. Therefore, in this embodiment, the adjacently-arranged planetary gears 12 around the outer circumferential direction of the sun gear 11 can be more distanced. Therefore, in this embodiment, the efficiency in transmitting the force between the sun gear 11 and the planetary gears 12 can be increased.

In this embodiment, the sun gear 11 and the planetary gears 12 are formed in the same shape. Also, in this embodiment, the number of magnetic poles given around the outer circumferential surface of the sun gear 11 is equal to the number of magnetic poles given around the outer circumferential surface of [each of] the planetary gears 12. Further, the reduction rate of the speed reduction device 1 is one-fourth. Therefore, in this embodiment, the sun gear 11 and the planetary gear 12 can be in common use. Accordingly, the number of different kinds of components used to configure the speed reduction device 1 can be reduced. Also, in this embodiment, the output shaft 3a of the motor 3 is connected to the sun gear 11 and the speed reduction device 1 is arranged at a position at which the rotation speed is relatively fast; therefore, the driving unit 2 can be made quieter.

(Modification Examples of Planetary Gear Speed Reduction Device)

FIG. 6 is a diagram to explain the configuration of the speed reduction device 1 of another embodiment of the present invention: (A) is an enlarged view of the portion of F in FIG. 2; (B) is an enlarged view of the portion of G in FIG. 2.

In the above-described embodiment, when the primary rotary shaft 14A and the planetary carrier 15 are in contact with each other in the front-rear direction, a gap is created between the secondary rotary shafts 14B and the planetary carrier 15 and between the planetary carrier 15 and the main body portion 16 in the front-rear direction. Beside this, when the planetary carrier 15 and the main body portion 16 are in contact with each other in the front-rear direction, a gap may be created between the four rotary shafts 14 and the planetary carrier 15 in the front-rear direction on both axial ends of the speed reduction device 1.

Figure 6A:
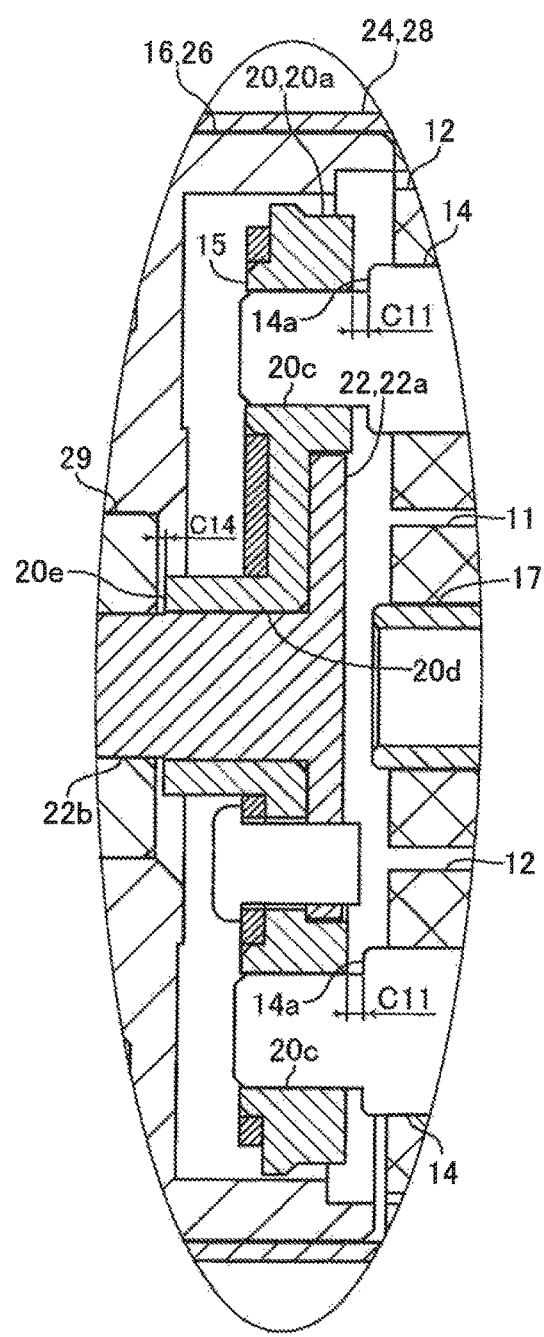
FIGS. 6(A)-6(B) are diagrams to explain the configuration of the planetary gear speed reduction device of another embodiment of the present invention.
Figure 6B:
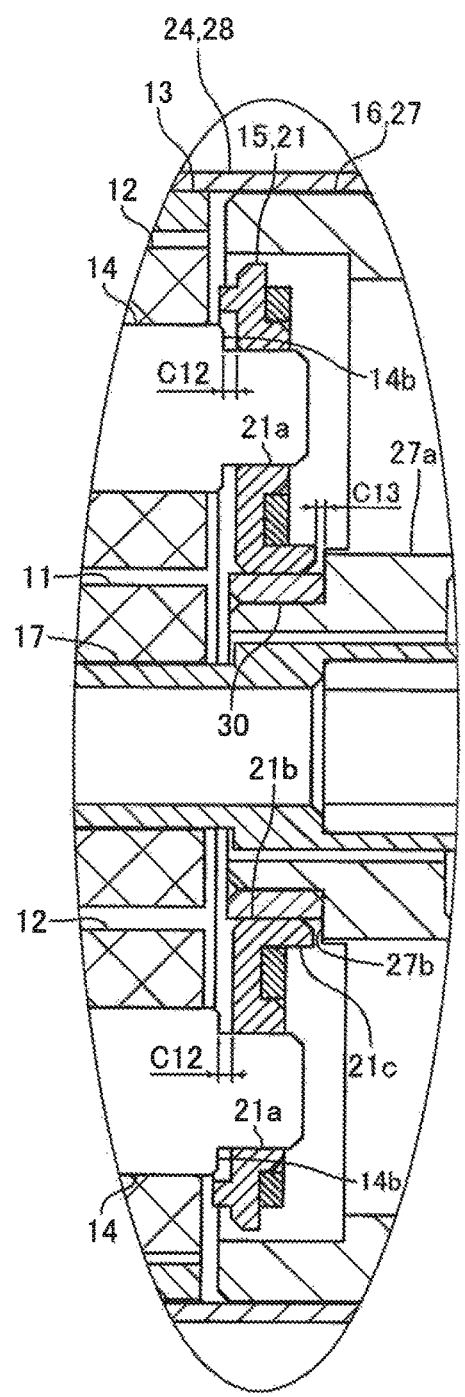

In this case, for example, the lengths of the large diameter portions between the step surfaces 14a and the step surfaces 14b of the four rotary shafts 14 are all equal; the gap C11 (see FIG. 6(A)) between the step surface 14a and the rear surface of the end plate portion 20a in the front-rear direction is the same among the four rotary shafts 14, and the gap C12 (FIG. 6(B)) between the step surface 14b and the front surface of the holding member 21 in the front-rear direction is also the same among the four rotary shafts 14. Also, in this case, the gap C13 (FIG. 6(B)) is created between the rear end surface of the protruding portion 21c and the contact surface 27b in the front-rear direction is smaller than the gap C11, and the gap C14 (FIG. 6(A)) between the front end surface of the protruding portion 20e and the rear end surface of the bearing 29 in the front-rear direction is smaller than the gap C12.

In other words, the total length of the gap C14, created in the front-rear direction between the planetary carrier 15 and the main body portion 16 on the front side, and the gap C13, created in the front-rear direction between the planetary carrier 15 and the main body portion 16 on the rear side, is shorter than the total length of the gap C11, created in the front-rear direction between the rotary shafts 14 and the planetary carrier 15 on the front side, and the gap C12, created in the front-rear direction between the rotary shafts 14 and the planetary carrier 15 on the rear side. Also, in this case, even when the planetary carrier 15 moves in the front-rear direction, the planetary carrier 15 and the rotary shafts 14 will not make contact with each other; therefore, as shown in FIG. 2, the magnetic center CL1 of the planetary gears 12 coincides in the front-rear direction with the magnetic center CL2 of the sun gear 11 and the internal gear 13.

In this case, friction loss occurs between the planetary carrier 15 and the main body portion 16 in the front-rear direction; however, no friction loss occurs in the front-rear direction between the four rotary shafts 14 and the planetary carrier 15. Therefore, even in this case, friction loss in the speed reduction device 1 in the front-rear direction can be reduced. Note that the contact area between the planetary carrier 15 and the main body portion 16 in the front-rear direction is larger than the contact area between the primary rotary shaft 14A and the planetary carrier 15 in the front-rear direction; therefore, the above-described embodiment can reduce friction loss in the speed reduction device 1 in the front-rear direction more effectively.

Note that, in the above-described embodiment, when the external force exerted on the planetary carrier 15 in the front-rear direction is larger than the magnetic attraction working between the sun gear 11, the internal gear 13 and one planetary gear 12 in the front-rear direction, the planetary carrier 15 may move further to the back from the position in which the step surface 14a of the primary rotary shaft 14A and the rear surface of the end plate portion 20a are in contact with each other or from the position in which the step surface 14b of the primary rotary shaft 14A and the front surface of the holding member 21 are in contact with each other. Thus, in this case, the step surface 14a of the primary rotary shaft 14A may make contact with the rear surface of the end plate portion 20a and the rear end surface of the protruding portion 21c may make contact with the contact surface 27b, and also the front end surface of the protruding portion 20e and the bearing 29 may make contact with each other. In other words, in this case, the primary rotary shaft 14A and the planetary carrier 15 may make contact with each other in the front-rear direction, and the planetary carrier 15 and the main body portion 16 may make contact with each other.

On the other hand, even when the external force exerted on the planetary carrier 15 in the front-rear direction is larger than the magnetic attraction working between the sun gear 11, the internal gear 13 and one planetary gear 12 in the front-rear direction, if a gap is created between the four rotary shafts 14 and the planetary carrier 15 in the front-rear direction on both axial ends of the speed reduction device 1 as in the modification example shown in FIG. 6, it is possible that the four rotary shafts 14 and the planetary carrier 15 will not make contact and friction loss in the speed reduction device 1 in the front-rear direction will be reduced. Therefore, when the external force exerted on the planetary carrier 15 in the front-rear direction is larger than the magnetic attraction working between the sun gear 11, the internal gear 13 and one planetary gear 12 in the front-rear direction, a gap may be created between the four rotary shafts 14 and the planetary carrier 15 in the front-rear direction on both axial ends of the speed reduction device 1 when the planetary carrier 15 and the main body portion 16 are in contact with each other in the front-rear direction.

Note that if the external force exerted on the planetary carrier 15 in the front-rear direction is larger than the magnetic attraction in the front-rear direction exerted between the sun gear 11, the internal gear 13 and one planetary gear 12, a worm gear (a screw gear) or a bevel gear, in place of the gear 23, is fixed on the front end of the shaft portion 22b when the gear 23 is a helical gear, or alternatively an impeller, in place of the gear 23, is fixed on the front end of the shaft portion 22b.

(Other Embodiments)

The above-described embodiment is an example of an embodiment of the present invention; however, it is not limited to this, but can be varyingly modified within the scope of the present invention.

In the above-described embodiment, the speed reduction device 1 is equipped with four planetary gears 12; however, the speed reduction device 1 may be equipped with any number of planetary gears other than four. Also, in the above-described embodiment, the sun gear 11 and the planetary gears 12 are formed in the same shape; however, as long as the outside diameter of the sun gear 11 and the outside diameter of the planetary gear 12 are the same, the shape of the sun gear 11 may be different from that of the planetary gear 12.

In the above-described embodiment, the three secondary rotary shafts 14B are formed in the same shape; however, one of the three secondary rotary shafts 14B may be formed in a different shape from others. Also, in the above-described embodiment, the speed reduction device 1 is equipped with four planetary gears 12; however, the speed reduction device 1 may be equipped with any number of planetary gears 12. In other words, the speed reduction device 1 may be equipped with any number of rotary shafts 14. Also, in the above-described embodiment, the sun gear 11 and the planetary gears 12 are formed in the same shape; however, the shape of the sun gear 11 may be different from that of the planetary gears 12. For example, the outside diameter of the sun gear 11 may be different from the outside diameter of the planetary gears 12.

In the above-described embodiment, the speed reduction device 4 is a mechanical speed reduction device; however, the speed reduction device 4 may be a magnetic speed reduction device. Also, in the above-described embodiment, the driving unit 2 is equipped with the speed reduction device 4; however, the driving unit 2 may not be equipped with the speed reduction device 4. In this case, the screw member 6 is connected to the output shaft of the speed reduction device 1. Further, in the above-described embodiment, the driving unit 2 is equipped with one speed reduction device; however, the driving unit 2 may be equipped with two or more speed reduction devices 1, which are connected in series. Also, in the above-described embodiment, the driving unit 2 moves an object-to-be-moved in a straight line; however, the driving unit 2 may rotate an object-to-be-moved.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A planetary gear speed reduction device comprising:
   a magnetic sun gear;
   a plurality of magnetic planetary gears which revolve around said magnetic sun gear while rotating;
   a magnetic internal gear arranged surrounding said plurality of magnetic planetary gears from an outer circumferential side;
   a plurality of rotary shafts, each of the plurality of rotary shafts being fixed to a corresponding one of the plurality of magnetic planetary gears;
   a planetary carrier which rotatably holds said plurality of rotary shafts; and
   a main body portion which rotatably holds said planetary carrier and to which said magnetic internal gear is fixed;
   wherein said plurality of rotary shafts are held by said planetary carrier such that the plurality of rotary shafts are movable in an axial direction thereof with respect to said planetary carrier;
   said planetary carrier is held by said main body portion such that said planetary carrier is movable in said axial direction with respect to said main body portion;
   when one of said plurality of rotary shafts is set as a primary rotary shaft and the remaining of said plurality of rotary shafts are respectively set as secondary rotary shafts,
   a total length of a gap in said axial direction between said primary rotary shaft and said planetary carrier on a first end in said axial direction and a gap in said axial direction between said primary rotary shaft and said planetary carrier on a second end in said axial direction is shorter than a total length of a gap in said axial direction between said secondary rotary shafts and said planetary carrier on the first end in said axial direction and a gap in said axial direction between said secondary rotary shafts and said planetary carrier on the second end in said axial direction, and a total length of a gap in said axial direction between said planetary carrier and said main body portion on a first end in said axial direction and a gap in said axial direction between said planetary carrier and said main body portion on a second end in said axial direction; and when said primary rotary shaft and said planetary carrier are in contact in said axial direction, a gap is to be created between said secondary shafts and said planetary carrier and between said planetary carrier and said main body portion on both ends in said axial direction.

2. The planetary gear speed reduction device as set forth in claim 1 wherein a magnetic center of said magnetic sun gear and said magnetic internal gear in said axial direction coincides with a magnetic center of said magnetic planetary gears in said axial direction;

an external force in said axial direction exerted on said planetary carrier is less than a magnetic attraction in said axial direction working between said magnetic sun gear, said magnetic internal gear and said magnetic planetary gear fixed to said primary rotary shaft.

3. The planetary gear speed reduction device as set forth in claim 1 wherein an outside diameter of said magnetic sun gear and an outside diameter of said magnetic planetary gears are equal.

4. The planetary gear speed reduction device as set forth in claim 3 said plurality of magnetic planetary gears comprises which are arranged at a pitch of 90° around said magnetic sun gear.

5. The planetary gear speed reduction device as set forth in claim 4 wherein said magnetic sun gear and said magnetic planetary gears are have a same shape; and a number of magnetic poles given on the outer circumferential surface of said sun gear and a number of magnetic poles given on the outer circumferential surface of each of said magnetic planetary gears are the same.

6. The planetary gear speed reduction device as set forth in claim 5 wherein a reduction rate is one-fourth.

7. A driving mechanism comprising:

the planetary gear speed reduction device of claim 1, a motor which is connected to an input side of said planetary gear speed reduction device and also connected to said magnetic sun gear by an output shaft thereof, and a reduction gear which is connected to an output side of said planetary gear speed reduction device.

8. A driving mechanism comprising:

the planetary gear speed reduction device of claim 1, a motor which is connected to an input side of said planetary gear speed reduction device and also connected to said magnetic sun gear by an output shaft thereof, and a magnetic speed reduction device which is connected to an output side of said planetary gear speed reduction device.

9. An planetary gear speed reduction device comprising:

a magnetic sun gear;

a plurality of magnetic planetary gears which revolve around said magnetic sun gear;

a magnetic internal gear arranged surrounding said plurality of magnetic planetary gears from an outer circumferential side;

a plurality of rotary shafts, each of the plurality of rotary shafts being fixed to a corresponding one of the plurality of magnetic planetary gears;

a planetary carrier which rotatably holds said plurality of rotary shafts; and a main body portion which rotatably holds said planetary carrier and to which said magnetic internal gear is fixed;

wherein said plurality of rotary shafts are held by said planetary carrier such that said plurality of rotary shafts are movable in an axial direction thereof with respect to said planetary carrier;

said planetary carrier is held by said main body portion such that said planetary carrier is movable said axial direction with respect to said main body portion;

a total length of a gap in said axial direction between said planetary carrier and said main body portion on a first end in said axial direction and a gap in said axial direction between said planetary carrier and said main body portion on a second end in said axial direction is smaller than a total length of a gap in said axial direction between said rotary shafts and said planetary carrier on the first end in said axial direction and a gap in said axial direction between said rotary shafts and said planetary carrier on the second end in said axial direction; and when said primary planetary carrier and said main body portion are in contact in said axial direction, a gap is to be created between said rotary shafts and said planetary carrier on both ends in said axial direction.

10. The planetary gear speed reduction device as set forth in claim 9 wherein a magnetic center of said magnetic sun gear and said magnetic internal gear in said axial direction coincides with a magnetic center of said magnetic planetary gears in said axial direction;

an external force in said axial direction exerted on said planetary carrier is larger than a magnetic attraction in said axial direction working between said sun gear, said magnetic internal gear and said one magnetic planetary gear.

* * * * *